(12) United States Patent
Nair et al.

(10) Patent No.: US 8,669,341 B2
(45) Date of Patent: *Mar. 11, 2014

(54) SOLID-STATE POLYMERIZATION OF A LIQUID CRYSTALLINE POLYMER

(75) Inventors: Kamlesh P. Nair, Florence, KY (US); Steven D. Gray, Mequon, WI (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,912

(22) Filed: Aug. 27, 2012

(65) Prior Publication Data

US 2013/0053533 A1   Feb. 28, 2013

Related U.S. Application Data

(60) Provisional application No. 61/528,424, filed on Aug. 29, 2011, provisional application No. 61/664,891, filed on Jun. 27, 2012.

(51) Int. Cl.
*C08G 63/02*   (2006.01)
*C08G 64/00*   (2006.01)

(52) U.S. Cl.
USPC .......................................... 528/193; 528/190

(58) Field of Classification Search
USPC ................................................. 528/190, 193
See application file for complete search history.

(56) References Cited

U.S. PATENT DOCUMENTS

| | | |
|---|---|---|
| 4,002,600 A | 1/1977 | Habermeier |
| 4,038,416 A | 7/1977 | Mori et al. |
| 4,083,829 A | 4/1978 | Calundann et al. |
| 4,132,840 A | 1/1979 | Hugl et al. |
| 4,161,470 A | 7/1979 | Calundann et al. |
| 4,163,099 A | 7/1979 | Buxbaum et al. |
| 4,184,996 A | 1/1980 | Calundann |
| 4,219,461 A | 8/1980 | Calundann |
| 4,256,624 A | 3/1981 | Calundann |
| 4,279,803 A | 7/1981 | Calundann |
| 4,318,841 A | 3/1982 | East et al. |
| 4,330,457 A | 5/1982 | East et al. |
| 4,330,668 A | 5/1982 | Hideo et al. |
| 4,337,190 A | 6/1982 | Calundann |
| 4,339,375 A | 7/1982 | Calundann et al. |
| 4,351,917 A | 9/1982 | Calundann et al. |
| 4,351,918 A | 9/1982 | Charbonneau et al. |
| 4,355,132 A | 10/1982 | East et al. |
| 4,355,134 A | 10/1982 | Charbonneau et al. |
| 4,375,530 A | 3/1983 | Hay et al. |
| 4,387,210 A | 6/1983 | Katoh et al. |
| 4,393,191 A | 7/1983 | East |
| 4,421,908 A | 12/1983 | East |
| 4,429,105 A | 1/1984 | Charbonneau |
| 4,434,262 A | 2/1984 | Buckley et al. |
| 4,473,682 A | 9/1984 | Calundann et al. |
| 4,511,709 A | 4/1985 | Yoo et al. |
| 4,522,974 A | 6/1985 | Calundann et al. |
| 4,563,508 A | 1/1986 | Cottis et al. |
| 4,581,399 A | 4/1986 | Yoon |
| 4,611,025 A | 9/1986 | Akkapeddi et al. |
| 4,650,836 A | 3/1987 | George et al. |
| 4,778,858 A | 10/1988 | Ginnings |
| 4,831,104 A | 5/1989 | Aya et al. |
| 4,851,562 A | 7/1989 | de Jonge et al. |
| 4,904,752 A | 2/1990 | Kanoe et al. |
| 4,952,662 A | 8/1990 | Finke et al. |
| 4,968,737 A | 11/1990 | Finke et al. |
| 4,980,444 A | 12/1990 | de Jonge et al. |
| 4,980,504 A | 12/1990 | de Jonge et al. |
| 5,093,464 A | 3/1992 | Yoon et al. |
| 5,102,935 A | 4/1992 | Heinz et al. |
| 5,120,820 A | 6/1992 | Fujiwara et al. |
| 5,162,489 A | 11/1992 | de Jonge et al. |
| 5,171,823 A | 12/1992 | Charbonneau et al. |
| 5,204,443 A | 4/1993 | Lee et al. |
| 5,221,730 A | 6/1993 | Morris et al. |
| 5,237,038 A | 8/1993 | Morris et al. |
| 5,258,470 A | 11/1993 | Poll et al. |

(Continued)

FOREIGN PATENT DOCUMENTS

| | | |
|---|---|---|
| EP | 0 055 480 | 7/1982 |
| EP | 0 071 968 | 2/1983 |

(Continued)

OTHER PUBLICATIONS

Abstract of German Patent—DE2041773, 1972, 1 page.
Abstract of German Patent—DE4017685, Dec. 5, 1991, 1 page.
Abstract of European Patent—EP0523326, Jan. 20, 1993, 1 page.
Abstract of Japanese Patent—JPS5893718, Jun. 3, 1983, 2 pages.
Abstract of Japanese Patent—JPS59196364, Nov. 7, 1984, 1 page.

(Continued)

*Primary Examiner* — Terressa Boykin
(74) *Attorney, Agent, or Firm* — Dority & Manning, P.A.

(57) ABSTRACT

A method for forming a high molecular weight thermotropic liquid crystalline polymer is provided. The method includes melt polymerizing two or more monomers in the presence of a unique aromatic amide oligomer to form a prepolymer, and then solid-state polymerizing the prepolymer to achieve a target molecular weight. The present inventors have discovered that a unique aromatic amide oligomer can be employed to help increase the "low shear" complex viscosity of the resulting solid-state polymerized composition. This allows for the attainment of higher than conventional "low shear" complex viscosity values and/or a substantial reduction in the solid-state polymerization time needed to achieve a target complex viscosity. In addition, the oligomeric flow aid can also accelerate the extent to which the "high shear" melt viscosity is increased during solid-state polymerization, which may also contribute to a substantial reduction in the solid-state polymerization time needed to achieve a certain molecular weight.

27 Claims, 3 Drawing Sheets

(56) References Cited

U.S. PATENT DOCUMENTS

| | | |
|---|---|---|
| 5,271,865 A | 12/1993 | Hittich et al. |
| 5,298,593 A | 3/1994 | Fujiwara et al. |
| 5,324,795 A | 6/1994 | Suenaga |
| 5,334,343 A | 8/1994 | Po' et al. |
| 5,352,746 A | 10/1994 | Asai et al. |
| 5,446,124 A | 8/1995 | Niwano et al. |
| 5,480,907 A | 1/1996 | Hayashi et al. |
| 5,496,893 A | 3/1996 | Gagné et al. |
| 5,500,294 A | 3/1996 | Sakumoto et al. |
| 5,510,189 A | 4/1996 | Sakumoto et al. |
| 5,534,187 A | 7/1996 | Miyazawa et al. |
| 5,541,240 A | 7/1996 | Makhija et al. |
| 5,541,267 A | 7/1996 | Akkapeddi et al. |
| 5,563,216 A | 10/1996 | Niwano et al. |
| 5,573,752 A | 11/1996 | Ranganathan et al. |
| 5,609,956 A | 3/1997 | Sakumoto et al. |
| 5,614,316 A | 3/1997 | Hashimoto et al. |
| 5,616,680 A | 4/1997 | Lindstid, III |
| 5,766,507 A | 6/1998 | Nakai |
| 5,779,936 A | 7/1998 | Miyasawa et al. |
| 5,976,406 A | 11/1999 | Nagano et al. |
| 5,997,765 A | 12/1999 | Furuta et al. |
| 6,114,492 A | 9/2000 | Lindstid, III et al. |
| 6,294,618 B1 | 9/2001 | Soelch |
| 6,312,772 B1 | 11/2001 | Kuder et al. |
| 6,376,076 B1 | 4/2002 | Ohbe et al. |
| 6,498,274 B1 | 12/2002 | Brown et al. |
| 6,514,611 B1 | 2/2003 | Shepherd et al. |
| 6,613,847 B2 | 9/2003 | Soelch |
| 6,649,730 B2 | 11/2003 | Okamoto et al. |
| 6,656,386 B2 | 12/2003 | Suenaga et al. |
| 6,680,002 B2 | 1/2004 | Yamauchi et al. |
| 6,702,956 B2 | 3/2004 | Maeda et al. |
| 6,740,728 B2 | 5/2004 | Ding et al. |
| 6,755,992 B2 | 6/2004 | Okamoto et al. |
| 7,179,401 B2 | 2/2007 | Ueno et al. |
| 7,238,714 B2 | 7/2007 | Nakao et al. |
| 7,335,318 B2 | 2/2008 | Asahara et al. |
| 7,343,675 B2 | 3/2008 | Smith et al. |
| 7,344,657 B2 | 3/2008 | Okamoto et al. |
| 7,393,467 B2 | 7/2008 | Asahara et al. |
| 7,405,250 B2 | 7/2008 | Kim |
| 7,507,784 B2 | 3/2009 | Dingemans et al. |
| 7,534,914 B2 | 5/2009 | Koike et al. |
| 7,592,413 B2 | 9/2009 | Citron et al. |
| 7,648,748 B2 | 1/2010 | Nakane et al. |
| 7,754,717 B2 | 7/2010 | Dimauro et al. |
| 7,759,344 B2 | 7/2010 | Booker et al. |
| 7,790,793 B2 | 9/2010 | Schmidt et al. |
| 7,795,315 B2 | 9/2010 | Chen et al. |
| 7,803,307 B2 | 9/2010 | Zimmerman |
| 7,824,572 B2 | 11/2010 | Okamoto |
| 7,825,176 B2 | 11/2010 | Kim et al. |
| 8,034,255 B2 | 10/2011 | Goldfinger |
| 8,084,476 B2 | 12/2011 | Koike et al. |
| 8,084,637 B2 | 12/2011 | Chopra et al. |
| 8,142,683 B2 | 3/2012 | Murouchi et al. |
| 8,309,734 B2 | 11/2012 | Bissantz et al. |
| 2004/0135118 A1 | 7/2004 | Waggoner |
| 2006/0019110 A1 | 1/2006 | Sato et al. |
| 2006/0073306 A1 | 4/2006 | Nakane et al. |
| 2007/0106035 A1 | 5/2007 | Gomurashvili et al. |
| 2007/0185118 A1 | 8/2007 | Hooft Van Huijsduijnen et al. |
| 2007/0232594 A1 | 10/2007 | Yokoyama et al. |
| 2009/0001317 A1 | 1/2009 | Okamoto |
| 2009/0111950 A1 | 4/2009 | Yamazaki et al. |
| 2009/0275697 A1 | 11/2009 | Waggoner et al. |
| 2010/0130743 A1 | 5/2010 | Wada et al. |
| 2011/0071304 A1 | 3/2011 | Fujimaki et al. |
| 2011/0184188 A1 | 7/2011 | Wada et al. |
| 2012/0022202 A1 | 1/2012 | Suh et al. |
| 2013/0048908 A1 | 2/2013 | Gray et al. |
| 2013/0048909 A1 | 2/2013 | Nair et al. |
| 2013/0048910 A1 | 2/2013 | Nair et al. |
| 2013/0048911 A1 | 2/2013 | Nair et al. |
| 2013/0048914 A1 | 2/2013 | Nair et al. |
| 2013/0053531 A1* | 2/2013 | Nair et al. ............ 528/190 |
| 2013/0053532 A1 | 2/2013 | Nair et al. |

FOREIGN PATENT DOCUMENTS

| | | |
|---|---|---|
| EP | 0 376 615 | 7/1990 |
| EP | 0 396 955 | 11/1990 |
| EP | 0 413 375 | 2/1991 |
| EP | 0 450 652 | 10/1991 |
| EP | 0 569 980 | 11/1993 |
| EP | 0 852 249 | 7/1998 |
| EP | 1 095 930 | 5/2001 |
| EP | 1 792 942 | 6/2007 |
| GB | 2 158 832 | 11/1985 |
| WO | WO 95/33803 | 12/1995 |
| WO | WO 98/22103 | 5/1998 |
| WO | WO 2004/058851 | 7/2004 |
| WO | WO 2007/038373 | 4/2007 |

OTHER PUBLICATIONS

Article—Siegmann et al., "Polyblends containing a liquid crystalline polymer," *Polymer*, 1985, vol. 26, August (conference issue), pp. 1325-1330.

Article—Dutta et al., "Polymer Blends Containing Liquid Crystals: A Review," *Polymer Engineering and Science*, Mid-Sep. 1990, vol. 30, No. 17, pp. 1005-1018.

Article—Oswai et al., "Synthesis and Characterization of Linear Aromatic Polyester-amides from Diacid Chlorides and Aminophenols," *Iranian Polymer Journal*, vol. 13, No. 3, 2004, pp. 205-212.

Abstract of Article—Preston et al., "Synthesis of high-molecular-weight rodlike polyamides and block copolymers," *Journal of Polymer Science: Polymer Chemistry Edition*, vol. 20, Issue 11, Nov. 1982, pp. 3241-3249.

Abstract of Article—Kajiyama et al., "Synthesis and properties of multiblock copolymers based on polydimethylsiloxane and piperazine-aromatic polyamides," *Journal of Applied Polymer Science*, vol. 39, Issue 8, Apr. 1990, pp. 1699-1708.

Abstract of Article—Ueda et al., "Synthesis of Sequential Polyamide by Direct Polycondensation," *Polymer Journal*, vol. 23, No. 3, 1991, pp. 167-176.

Article—Quamara et al., "Thermally stimulated depolarization current Investigations of copolyesteramide (Vectra B 950) polymer liquid crystal," *Materials Science—Poland*, vol. 28, No. 3, 2010, pp. 679-691.

Paper—Olena Rudko, "Liquid crystalline polymers. Uniaxial-biaxial nematic phase transition," *Term Paper for Physics 498, Emergent States of Matter*, May 6, 2002, pp. 112 (Department of Physics, University of Illinois at Urbana-Champaign).

Abstract of Article and Article—Ishida et al., "Unusual Thermal Behavior of the Aromatic Polyamide Dendrons," *Kobunshi Ronbunshu*, vol. 57, No. 12, Dec. 2000, pp. 825-829.

Search Report and Written Opinion for PCT/US2012/052437 dated Feb. 6, 2013, 11 pages.

Abstract of Japanese Patent—JPH06347770A, Dec. 22, 1994, 2 pages.

Abstract of Japanese Patent—JPH09143347A, Jun. 3, 1997, 1 page.

Abstract of Japanese Patent—JPH09249813A, Sep. 22, 1997, 2 pages.

Abstract of Japanese Patent—JPH1160927A, Mar. 5, 1999, 2 pages.

Abstract of Japanese Patent—JP2004182748A, Jul. 2, 2004, 1 page.

Abstract of Japanese Patent—JP2005248052A, Sep. 15, 2005, 1 page.

Abstract of Japanese Patent—JP2005298772A, Oct. 27, 2005, 1 page.

Abstract of Japanese Patent—JP2007238851A, Sep. 20, 2007, 1 page.

Abstract of Japanese Patent—JP2009108179A, May 21, 2009, 1 page.

Abstract of Japanese Patent—JP2009108180A, May 21, 2009, 1 page.

(56) References Cited

OTHER PUBLICATIONS

Abstract of Japanese Patent—JP2010174114A, Aug. 12, 2010, 1 page.
Abstract of Taiwanese Patent—TW397859B, Jul. 11, 2000, 1 page.
Abstract of Japanese Patent—JPS5861145, Apr. 12, 1983, 1 page.
Abstract of Japanese Patent—JPS5861146, Apr. 12, 1983, 1 pages.
Abstract of Japanese Patent—JPS5883048, May 18, 1983, 2 pages.
Abstract of Japanese Patent—JPS58219233, Dec. 20, 1983, 2 pages.
Abstract of Japanese Patent—JP559196364, Nov. 7, 1984, 1 page.
Abstract of Japanese Patent—JPS6049026, Mar. 18, 1984, 2 pages.
Abstract of Japanese Patent—JPS63137950, Jun. 9, 1988, 1 page.
Abstract of Japanese Patent—JPS63280730, Nov. 17, 1988, 2 pages.
Abstract of Japanese Patent—JPS63280731, Nov. 17, 1998, 1 page.
Abstract of Japanese Patent—JPS63280732, Nov. 17, 1988, 2 pages.
Abstract of Japanese Patent—JPH01115926, May 9, 1989, 1 page.
Abstract of Japanese Patent—JPH02151626, Jun. 11, 1990, 1 page.
Abstract of Japanese Patent—JPH02240134, Sep. 25, 1990, 1 page.
Abstract of Japanese Patent—JPH02240138, Sep. 25, 1990, 1 page.
Abstract of Japanese Patent—JPH03072559, Mar. 27, 1991, 1 page.
Abstract of Japanese Patent—JPH03095260, Apr. 19, 1991, 2 pages.
Abstract of Japanese Patent—JPH0673239, Mar. 15, 1994, 1 page.
Abstract of Japanese Patent—JP2006225644, Aug. 31, 2006, 1 page.
Abstract of Japanese Patent—JP2006257047, Sep. 28, 2006, 1 page.
Abstract of Polish Patent—PL92807, 1977, 1 page.
Article—Han et al., "A Change in Mechanism from Acidolysis to Phenolysis in the Bulk Copolymerization of 4-Acetoxybenzoic Acid and 6-Acetoxy-2-naphthoic Acid," *Macromolecules*, 1996, vol. 29, No. 26, pp. 8313-8320.
Article—Gale et al., "Conformational Control of Selectivity and Stability in Hybrid Amide/Urea Macrocycles," *Chem. Eur. J.*, vol. 13, 2007, pp. 3320-3329.
Abstract of Article—Ueda et al., "Diphenyl (2,3-Dihydro-2-thioxo-3-benzoxazolyl)phosphonate: A New, Reactive Activating Agent for the Synthesis of Amides and Polyamides," *Macromolecules*, vol. 21, No. 1, 1988, pp. 19-24.
Article—Washio et al., "Facile Synthesis of Polyamide Dendrimers from Unprotected $AB_2$ Building Blocks: Dumbbell-Shaped Dendrimer, Star-Shaped Dendrimer, and Dendrimer with a Carboxylic Acid at the Core," *Macromolecules*, vol. 38, No. 6, 2005, pp. 2237-2246.
Article—Kuz'min et al., "Kinetics of Acylation of Anilines Monosubstituted in the Ring by Benzoyl Chloride in N,N-Dimethylacetamide," *Zhurnal Organicheskoi Khimii*, vol. 17, No. 11, pp. 2394-2396.
Abstract of Article—Shaul M. Aharoni, "Hydrogen-Bonded Highly Regular Strictly Alternating Aliphatic-Aromatic Liquid Crystalline Poly(ester amides)," *Macromolecules*, Vo. 21, 1988, pp. 1941-1961.
Article—Li et al., "Modification of rheological properties of a thermotropic liquid crystalline polymer by melt-state reactive processing," *Polymer*, 2012, pp. 1-8.
Article—Shaul M. Aharoni, "Monodisperse Rodlike Oligomers and Their Mesomorphic Higher Molecular Weight Homologues," *Macromolecules*, vol. 20, No. 8, 1987, pp. 2010-2017.

\* cited by examiner

SOLID-STATE POLYMERIZATION OF A LIQUID CRYSTALLINE POLYMER

RELATED APPLICATIONS

The present application claims priority to U.S. provisional application Ser. Nos. 61/528,424, filed on Aug. 29, 2011, and 61/664,891, filed on Jun. 27, 2012, which are incorporated herein in their entirety by reference thereto.

BACKGROUND OF THE INVENTION

Thermotropic liquid crystalline polymers are classified as "rigid rod" polymers as their molecular structure is typically composed of aromatic units linked by functional groups such as esters and/or amides. The rigid, rod-like structure allows the polymers to exhibit liquid crystalline behavior in their molten state (thermotropic nematic state). High molecular weight liquid crystalline polymers have interesting properties, such as a high melt viscosity, high thermal stability, and enhanced flow along with good mechanical properties. These properties make them attractive in diverse fields such as sheet extrusion, thermoforming processes, etc. For these types of applications, it is advantageous to have a material with high melt strength or enhanced "low shear" viscosity. Due to the high melting points of these polymers (e.g., above about 350° C.), however, the melt viscosity required for these applications is very high and must be obtained by solid-state polymerization. In a solid-state polymerization process, a low molecular weight, melt polymerized prepolymer is heated below its melting point (and above its glass transition temperature) so that chain-extension can take place and result in a higher molecular weight resulting in increased melt viscosity of the polymer. However this process can be quite time-consuming and thus can significantly add more cost to the product.

As such, a need currently exists for a technique of accelerating the build-up of viscosity during solid-state polymerization, which can in turn decrease the time needed to achieve the required melt viscosity.

SUMMARY OF THE INVENTION

In accordance with one embodiment of the present invention, a method for forming a liquid crystalline polymer is disclosed. The method comprises melt polymerizing two or more monomers in the presence of an aromatic amide oligomer to form a prepolymer and thereafter, solid-state polymerizing the prepolymer to form the liquid crystalline polymer. The oligomer has a molecular weight of from about 325 to about 5,000 grams per mole and has the following general formula (I):

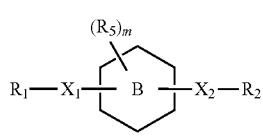

(I)

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

In accordance with another embodiment of the present invention, a sheet for use in thermforming an article is disclosed. The sheet comprises a thermotropic liquid crystalline polymer composition that comprises a liquid crystalline polymer melt polymerized in the presence of an aromatic amide oligomer. The composition has a melt viscosity of from about 150 to about 1,500 Pa-s as determined at a shear rate of 1000 seconds$^{-1}$ and a temperature of 370° C. and a complex viscosity of about 200 kPa-s or more as determined at an angular frequency of 0.15 radians per second, temperature of 370° C., and constant strain amplitude of 1%.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION OF REPRESENTATIVE EMBODIMENTS

Definitions

Figure 1:
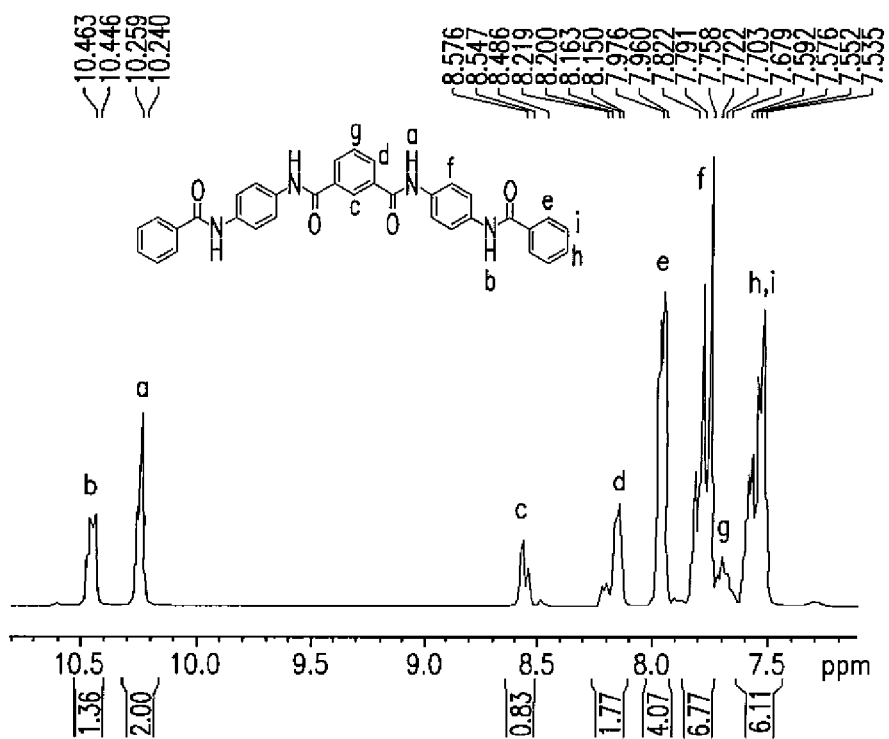
FIG. 1 is the Proton NMR characterization for N1,N3-bis(4-benzamidophenyl)benzene-1,3-dicarboxamide (Compound C2)

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH_2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation ($>C=C<$). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and Spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g. 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C<ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g. imidazolyl) and multiple ring systems (e.g. benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g. 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g. decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

"Liquid crystalline polymer" or "liquid crystal polymer" refers to a polymer that can possess a rod-like structure that allows it to exhibit liquid crystalline behavior in its molten state (e.g., thermotropic nematic state). The polymer may contain aromatic units (e.g., aromatic polyesters, aromatic polyesteramides, etc.) so that it is wholly aromatic (e.g., containing only aromatic units) or partially aromatic (e.g., containing aromatic units and other units, such as cycloaliphatic units). The polymer may also be fully crystalline or semi-crystalline in nature.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a method for forming a high molecular weight thermotropic liquid crystalline polymer. The method includes melt polymerizing two or more monomers to form a prepolymer, and then solid-state polymerizing the prepolymer to achieve a target molecular weight. The present inventors have discovered that a unique aromatic amide oligomer can be employed to help increase the "low shear" complex viscosity of the resulting solid-state polymerized composition. This allows for the attainment of higher than conventional "low shear" complex viscosity values and/or a substantial reduction in the solid-state polymerization time needed to achieve a target complex viscosity. For instance, the polymer composition may have a "low shear" complex viscosity of about 100 kilopascal-seconds ("kPa-s") or more, in some embodiments about 200 kPa-s or more, in some embodiments from about 300 kPa-s to about 2,000 kPa-s, and in some embodiments, from about 500 kPa-s to about 1,500 kPa-s. The low shear viscosity may be determined by a parallel plate rheometer at an angular frequency of 0.15 radians per second, a temperature of 375° C., and at a constant strain amplitude of 1%.

In certain embodiments, the oligomeric flow aid may also accelerate the extent to which the "high shear" melt viscosity is increased during solid-state polymerization, which can correlate to the rate at which chain extension of the prepolymer occurs. This increased rate of chain extension may also contribute to a substantial reduction in the solid-state polymerization time needed to achieve a certain molecular weight. In this regard, the ratio of the "high shear" melt viscosity of the solid-state polymerized composition to the "high shear" melt viscosity of the melt-polymerized prepolymer is typically from about 3 to about 20, in some embodiments from about 4 to about 15, and in some embodiments, from about 5 to about 10. For example, the solid-state polymerized composition may have a melt viscosity (at a temperature of 375° C. and shear rate of 1000 seconds$^{-1}$) of from about 100 to about 2,000 Pa-s, in some embodiments from about 150 to about 1,500 Pa-s, and in some embodiments, from about 200 to about 900 Pa-s, and the melt-polymerized prepolymer may have a melt viscosity (at a temperature of 375° C. and shear rate of 1000 seconds$^{-1}$) of from about 10 to about 250 Pa-s, in some embodiments from about 15 to about 200 Pa-s, and in some embodiments, from about 20 to about 150 Pa-s.

One benefit of the aromatic amide flow aid is that it is not easily volatized or decomposed, which allows the additive to be processed at relatively high temperatures during the polymerization reaction. Without intending to be limited by theory, it is believed that active hydrogen atoms of the amide functional groups are capable of forming a hydrogen bond with the backbone of liquid crystalline polyesters or polyesteramides. Such hydrogen bonding strengthens the attachment of the oligomer to the liquid crystalline polymer matrix and thus minimizes the likelihood that it becomes volatilized during formation. In this regard, the oligomer generally possesses a high amide functionality so it is capable of undergoing a sufficient degree of hydrogen bonding with the liquid crystalline polymer. The degree of amide functionality for a given molecule may be characterized by its "amide equivalent weight", which reflects the amount of a compound that contains one molecule of an amide functional group and may be calculated by dividing the molecular weight of the compound by the number of amide groups in the molecule. For example, the aromatic amide oligomer may contain from 2 to 15, in some embodiments from 3 to 12, and in some embodiments, from 3 to 8 amide functional groups per molecule. The amide equivalent weight may likewise be from about 10 to about 1,000 grams per mole or less, in some embodiments from about 50 to about 500 grams per mole, and in some embodiments, from about 100 to about 300 grams per mole. The total weight of the oligomer is also high enough so that it can effectively increase the low shear viscosity of the polymer, yet not so high that polymerization is substantially inhibited. In this regard, the oligomer typically has a molecular weight of from about 325 to about 5,000 grams per mole, in some embodiments from about 350 to about 3,000 grams per mole, in some embodiments from about 375 to about 2,500 grams per mole, and in some embodiments, from about 400 to about 1,500 grams per mole.

While providing the benefits noted above, the aromatic amide oligomer does not generally form covalent bonds with the polymer backbone of the liquid crystalline polymer to any appreciable extent so that the mechanical properties of the polymer are not adversely impacted. To help better minimize reactivity, the oligomer typically contains a core formed from one or more aromatic rings (including heteroaromatic). The oligomer may also contain terminal groups formed from one or more aromatic rings and/or cycloalkyl groups. Such an "aromatic" oligomer thus possesses little, if any, reactivity with the base liquid crystalline polymer. For example, one embodiment of such an aromatic amide oligomer is provided below in Formula (I):

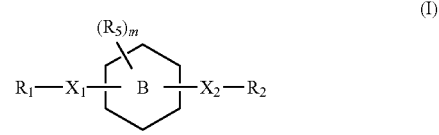

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

In certain embodiments, Ring B in Formula (I) above may be selected from the following:

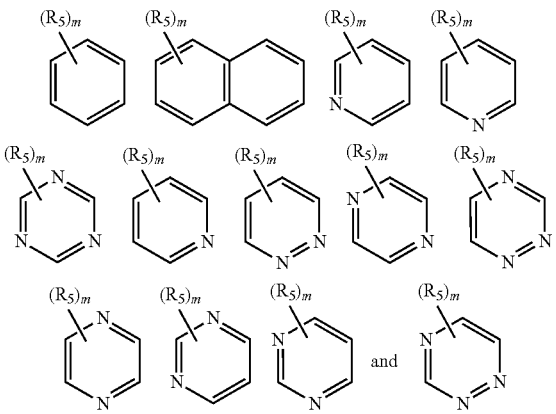

wherein, m is 0, 1, 2, 3, or 4, in some embodiments m is 0, 1, or 2, in some embodiments m is 0 or 1, and in some embodiments, m is 0; and $R_5$ is halo, haloalkyl, alkyl, alkenyl, aryl, heteroaryl, cycloalkyl, or heterocyclyl. Ring B may be phenyl.

In certain embodiments, the oligomer is a di-functional compound in that Ring B is directly bonded to only two (2) amide groups (e.g., C(O)HN or NHC(O)). In such embodiments, m in Formula (I) may be 0. Of course, in certain embodiments, Ring B may also be directly bonded to three (3) or more amide groups. For example, one embodiment of such a compound is provided by general formula (II):

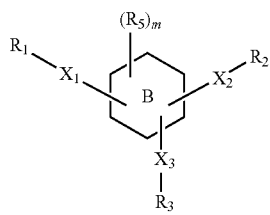

(II)

wherein, ring B, $R_5$, $X_1$, $X_2$, $R_1$, and $R_2$ are as defined above;

m is from 0 to 3;

$X_3$ is C(O)HN or NHC(O); and $R_3$ is selected from aryl, heteroaryl, cycloalkyl, and heterocyclyl.

Another embodiment of such a compound is provided by general formula (III):

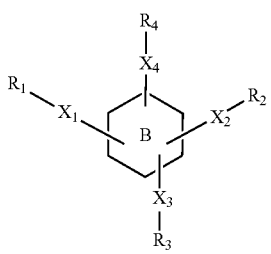

(III)

wherein, ring B, $R_5$, $X_1$, $X_2$, $X_3$, $R_1$, $R_2$, and $R_3$ are as defined above;

$X_4$ is C(O)HN or NHC(O); and $R_4$ is selected from aryl, heteroaryl, cycloalkyl, and heterocyclyl.

In some embodiments, $R_1$, $R_2$, $R_3$, and/or $R_4$ in the structures noted above may be selected from the following:

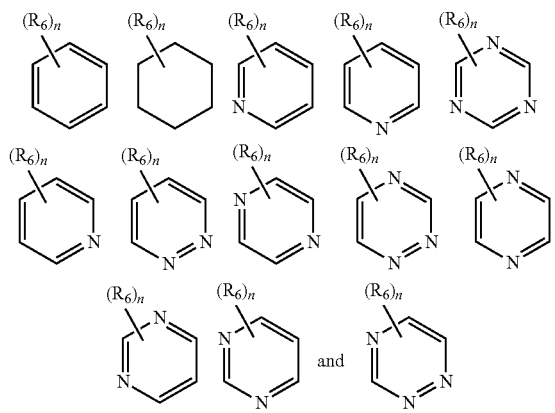

wherein, n is 0, 1, 2, 3, 4, or 5, in some embodiments n is 0, 1, or 2, and in some embodiments, n is 0 or 1; and $R_6$ is halo, haloalkyl, alkyl, alkenyl, aryl, heteroaryl, cycloalkyl, or heterocyclyl.

In one embodiment, the aromatic amide oligomer has the following general formula (IV):

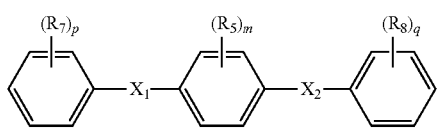

(IV)

wherein, $X_1$ and $X_2$ are independently C(O)HN or NHC(O);

$R_5$, $R_7$, and $R_8$ are independently selected from halo, haloalkyl, alkyl, alkenyl, alkynyl, aryl, heteroaryl, cycloalkyl, and heterocyclyl;

m is from 0 to 4; and p and q are independently from 0 to 5.

For example, in certain embodiments, m, p, and q in Formula (IV) may be equal to 0 so that the core and terminal groups are unsubstituted. In other embodiments, m may be 0 and p and q may be from 1 to 5. In such embodiments, for example, $R_7$ and/or $R_8$ may be halo (e.g., fluorine). In other embodiments, $R_7$ and/or $R_8$ may be aryl (e.g., phenyl), cycloalkyl (e.g., cyclohexyl), or aryl and/or cycloalkyl substituted with an amide group having the structure: —C(O)$R_{12}$N— or —NR$_{13}$C(O)—, wherein $R_{12}$ and $R_{13}$ are independently selected from hydrogen, alkyl, alkenyl, aryl, heteroaryl, cycloalkyl, and heterocyclyl. In one particular embodiment, for example, $R_7$ and/or $R_8$ are phenyl substituted with —C(O)HN— or —NHC(O)—. In yet other embodiments, $R_7$ and/or $R_8$ may be heteroaryl (e.g., pyridinyl).

In yet another embodiment, the aromatic amide oligomer has the following general formula (V):

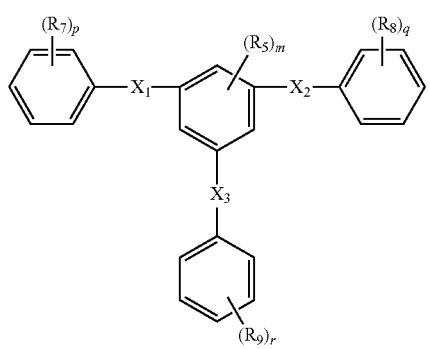

(V)

wherein, $X_1$, $X_2$, and $X_3$ are independently C(O)HN or NHC(O);

$R_5$, $R_7$, $R_8$, and $R_9$ are independently selected from halo, haloalkyl, alkyl, alkenyl, alkynyl, aryl, heteroaryl, cycloalkyl, and heterocyclyl;

m is from 0 to 3; and p, q, and r are independently from 0 to 5.

For example, in certain embodiments, m, p, q, and r in Formula (V) may be equal to 0 so that the core and terminal aromatic groups are unsubstituted. In other embodiments, m may be 0 and p, q, and r may be from 1 to 5. In such embodiments, for example, $R_7$, $R_8$, and/or $R_9$ may be halo (e.g., fluorine). In other embodiments, $R_7$, $R_8$, and/or $R_9$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl. In one particular embodiment, for example, $R_7$, $R_8$, and/or $R_9$ are phenyl substituted with —C(O)HN— or —NHC(O)—. In yet other embodiments, $R_7$, $R_8$, and/or $R_9$ may be heteroaryl (e.g., pyridinyl).

Specific embodiments of the aromatic amide oligomer of the present invention are also set forth in the table below:

| Cmpd # | Structure | Name | MW (g/mol) |
|---|---|---|---|
| A |  | N1,N4-bis(4-benzamidophenyl)terephthalamide | 554.6 |
| B |  | N4-phenyl-N1-[4-[[4-(phenylcarbamoyl)benzoyl]amino]phenyl]terephthalamide | 554.6 |
| C1 |  | N4-phenyl-N1-[3-[[4-(phenylcarbamoyl)benzoyl]amino]phenyl]terephthalamide | 554.6 |
| C2 |  | N1,N3-bis(4-benzamidophenyl)benzene-1,3-dicarboxamide | 554.6 |

-continued

| Cmpd # | Structure | Name | MW (g/mol) |
|---|---|---|---|
| D1 | | N3-phenyl-N1-[3-[[3-(phenylcarbamoyl)benzoyl]amino]phenyl]benzene-1,3-dicarboxamide | 554.6 |
| D2 | | N1,N3-bis(3-benzamidophenyl)benzene-1,3-dicarboxamide | 554.6 |
| E | | N1,N3-bis(4-phenylphenyl)benzene-1,3-dicarboxamide | 468.5 |
| F | | N1,N3,N5-triphenylbenzene-1,3,5-tricarboxamide | 435.5 |

-continued

| Cmpd # | Structure | Name | MW (g/mol) |
|---|---|---|---|
| G | | N-(4,6-dibenzamido-1,3,5-triazin-2-yl)benzamide | 438.4 |
| H | | N1,N3,N5-tris(4-benzamidophen-yl)benzene-1,3,5-tricarboxamide | 792.8 |
| I | | N1,N3,N5-tris(3-benzamidophen-yl)benzene-1,3,5-tricarboxamide | 792.8 |

The precursor monomers employed during melt polymerization of the liquid crystalline polymer may generally vary as is known in the art. For example, suitable thermotropic liquid crystalline polymers may include instance, aromatic polyesters, aromatic poly(esteramides), aromatic poly(estercarbonates), aromatic polyamides, etc., and may likewise contain repeating units formed from one or more aromatic or aliphatic hydroxycarboxylic acids, aromatic or aliphatic dicarboxylic acids, aromatic or aliphatic diols, aromatic or aliphatic aminocarboxylic acids, aromatic or aliphatic amines, aromatic or aliphatic diamines, etc., as well as combinations thereof.

Aromatic polyesters, for instance, may be obtained by polymerizing (1) two or more aromatic hydroxycarboxylic acids; (2) at least one aromatic hydroxycarboxylic acid, at least one aromatic dicarboxylic acid, and at least one aromatic diol; and/or (3) at least one aromatic dicarboxylic acid and at least one aromatic diol. Examples of suitable aromatic hydroxycarboxylic acids include, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof. Examples of suitable aromatic dicarboxylic acids include terephthalic acid; isophthalic acid; 2,6-naphthalenedicarboxylic acid; diphenyl ether-4,4'-dicarboxylic acid; 1,6-naphthalenedicarboxylic acid; 2,7-naphthalenedicarboxylic acid; 4,4'-dicarboxybiphenyl; bis(4-carboxyphenyl)ether; bis(4-carboxyphenyl)butane; bis(4-carboxyphenyl)ethane; bis(3-carboxyphenyl)ether; bis(3-carboxyphenyl)ethane, etc., as well as alkyl, alkoxy, aryl and halogen substituents thereof. Examples of suitable aromatic diols include hydroquinone; resorcinol; 2,6-dihydroxynaphthalene; 2,7-dihydroxynaphthalene; 1,6-dihydroxynaphthalene; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof. In one particular embodiment, the aromatic polyester contains monomer repeat units derived from 4-hydroxybenzoic acid and 2,6-hydroxynaphthoic acid. The monomer units derived from 4-hydroxybenzoic acid may constitute from about 45% to about 85% (e.g., 73%) of the polymer on a mole basis and the monomer units derived from 2,6-hydroxynaphthoic acid may constitute from about 15% to about 55% (e.g., 27%) of the polymer on a mole basis. Such aromatic polyesters are commercially available from Ticona, LLC under the trade designation VECTRA® A. The synthesis and structure of these and other aromatic polyesters may be described in more detail in U.S. Pat. Nos. 4,161,470; 4,473,682; 4,522,974; 4,375,530; 4,318,841; 4,256,624; 4,219,461; 4,083,829; 4,184,996; 4,279,803; 4,337,190; 4,355,134; 4,429,105; 4,393,191; 4,421,908; 4,434,262; and 5,541,240.

Liquid crystalline polyesteramides may likewise be obtained by polymerizing (1) at least one aromatic hydroxycarboxylic acid and at least one aromatic aminocarboxylic acid; (2) at least one aromatic hydroxycarboxylic acid, at least one aromatic dicarboxylic acid, and at least one aromatic amine and/or diamine optionally having phenolic hydroxy groups; and (3) at least one aromatic dicarboxylic acid and at least one aromatic amine and/or diamine optionally having phenolic hydroxy groups. Suitable aromatic amines and diamines may include, for instance, 3-aminophenol; 4-aminophenol; 1,4-phenylenediamine; 1,3-phenylenediamine, etc., as well as alkyl, alkoxy, aryl and halogen substituents thereof. In one particular embodiment, the aromatic polyesteramide contains monomer units derived from 2,6-hydroxynaphthoic acid, terephthalic acid, and 4-aminophenol. The monomer units derived from 2,6-hydroxynaphthoic acid may constitute from about 35% to about 85% of the polymer on a mole basis (e.g., 60%), the monomer units derived from terephthalic acid may constitute from about 5% to about 50% (e.g., 20%) of the polymer on a mole basis, and the monomer units derived from 4-aminophenol may constitute from about 5% to about 50% (e.g., 20%) of the polymer on a mole basis. Such aromatic polyesters are commercially available from Ticona, LLC under the trade designation VECTRA® B. In another embodiment, the aromatic polyesteramide contains monomer units derived from 2,6-hydroxynaphthoic acid, and 4-hydroxybenzoic acid, and 4-aminophenol, as well as other optional monomers (e.g., 4,4'-dihydroxybiphenyl and/or terephthalic acid). The synthesis and structure of these and other aromatic poly(esteramides) may be described in more detail in U.S. Pat. Nos. 4,339,375; 4,355,132; 4,351,917; 4,330,457; 4,351,918; and 5,204,443.

Regardless of its particular constituents, a melt polymerized prepolymer may be prepared by introducing the appropriate monomer(s) (e.g., aromatic hydroxycarboxylic acid, aromatic dicarboxylic acid, aromatic dial, aromatic amine, aromatic diamine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner, which are incorporated herein in their entirety by reference thereto for all relevant purposes. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as referenced above and known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C.

Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

The aromatic amide oligomer of the present invention is typically added to the polymerization apparatus employed during melt polymerization. Although it may be introduced at any time, it is normally desired to apply the oligomer before melt polymerization has been initiated, and typically in conjunction with the precursor monomers for the liquid crystalline polymer. The relative amount of the aromatic amide oligomer added to the reaction mixture may be selected to help achieve a balance between viscosity and mechanical properties. In most embodiments, for example, the aromatic amide oligomer is employed in an amount of from about 0.1 to about 5 parts, in some embodiments from about 0.2 to about 4 parts, and in some embodiments, from about 0.3 to about 1.5 parts by weight relative to 100 parts by weight of the reaction mixture. The aromatic amide oligomers may, for example, constitute from about 0.1 wt. % to about 5 wt. %, in some embodiments from about 0.2 wt. % to about 4 wt. %, and in some embodiments, from about 0.3 wt. % to about 1.5 wt. % of the reaction mixture. Liquid crystalline polymers may likewise constitute from about 95 wt. % to about 99.9 wt. %, in some embodiments from about 96 wt. % to about 98.8 wt. %, and in some embodiments, from about 98.5 wt. % to about 99.7 wt. % of the reaction mixture. While referred to in terms of the reaction mixture, it should also be understood that the ratios and weight percentages may also be applicable to the final polymer composition. That is, the parts by weight of the oligomer relative to 100 parts by weight of liquid crystalline polymer and the percentage of the oligomer in the final polymer composition may be within the ranges noted above.

In addition to the monomers, oligomer, and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming an aromatic polyester may include charging precursor monomers (e.g., 4-hydroxybenzoic acid and 2,6-hydroxynaphthoic acid), aromatic amide oligomer, and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder.

After melt polymerization, the resulting prepolymer is then subjected to a solid-state polymerization process as is known in the art. For instance, solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization zone can be of virtually any design that will allow the polymer to be maintained at the desired solid-state polymerization temperature for the desired residence time. Examples of such solid-state polymerization zones can be reactors that have a fixed bed, static bed, moving bed, etc. The temperature at which solid-state polymerization is performed may vary, but is typically within a range of about 200° C. to about 350° C., in some embodiments from about 225° C. to about 325° C., and in some embodiments, from about 250° C. to about 300° C. The polymerization time will of course vary based on the temperature and target molecular weight. In most cases, however, the solid-state polymerization time will be from about 2 to about 12 hours, and in some embodiments, from about 4 to about 10 hours.

Regardless of the particular manner in which it is formed, the resulting solid-state polymerized liquid crystalline polymer will generally have a high number average molecular weight ($M_n$), such as about 2,000 grams per mole or more, in some embodiments from about 4,000 grams per mole or more, and in some embodiments, from about 5,000 to about 30,000 grams per mole. Of course, it is also possible to form polymers having a lower molecular weight, such as less than about 2,000 grams per mole, using the method of the present invention. The intrinsic viscosity of the polymer composition, which is generally proportional to molecular weight, may also be relatively high. For example, the intrinsic viscosity may be about 4 deciliters per gram ("dL/g") or more, in some embodiments about 5 dL/g or more, in some embodiments from about 6 to about 20 dL/g, and in some embodiments from about 7 to about 15 dL/g. Intrinsic viscosity may be determined in accordance with ISO-1628-5 using a 50/50 (v/v) mixture of pentafluorophenol and hexafluoroisopropanol, as described in more detail below.

The melting point of the polymer composition may also range from about 250° C. to about 400° C., in some embodiments from about 270° C. to about 380° C., and in some embodiments, from about 300° C. to about 360° C. Likewise, the crystallization temperature may range from about 200° C. to about 400° C., in some embodiments from about 250° C. to about 350° C., and in some embodiments, from about 280° C. to about 320° C. The melting and crystallization temperatures may be determined as is well known in the art using differential scanning calorimetry ("DSC"), such as determined by ISO Test No. 11357.

If desired, the resulting polymer composition may also be combined with a wide variety of other types of components to form a filled composition. For example, a filler material may be incorporated with the polymer composition to enhance strength. A filled composition can include a filler material such as a fibrous filler and/or a mineral filler and optionally one or more additional additives as are generally known in the art.

Mineral fillers may, for instance, be employed in the polymer composition to help achieve the desired mechanical properties and/or appearance. When employed, mineral fillers typically constitute from about 5 wt. % to about 60 wt. %, in same embodiments from about 10 wt. % to about 55 wt. %, and in some embodiments, from about 20 wt. % to about 50 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2$ $(Si,Al)_4O_{10}$ $[(OH)_2,(H_2O)]$), montmorillonite ($(Na,Ca)_{0.33}(Al,Mg)_2$ $Si_4O_{10}(OH)_2 \cdot nH_2O$), vermiculite (($MgFe,Al)_3(Al,Si)_4O_{10}$ $(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)$ $O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Fibers may also be employed as a filler material to further improve the mechanical properties. Such fibers generally have a high degree of tensile strength relative to their mass. For example, the ultimate tensile strength of the fibers (determined in accordance with ASTM 02101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in electronic components, the high strength fibers may be formed from materials that are also generally insulative in nature, such as glass, ceramics (e.g., alumina or silica), aramids (e.g., Kevlar® marketed by E. I. duPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The volume average length of the fibers may be from about 50 to about 400 micrometers, in some embodiments from about 80 to about 250 micrometers, in some embodiments from about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 50 to about 400 micrometers, in some embodiments from about 80 to about 250 micrometers, in some embodiments from about 100 to about 200 micrometers, and in some embodiments, from about 110 to about 180 micrometers. The fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 10 to about 35 micrometers, and in some embodiments, from about 15 to about 30 micrometers.

The relative amount of the fibers in the filled polymer composition may also be selectively controlled to help achieve the desired mechanical properties without adversely impacting other properties of the composition, such as its flowability. For example, the fibers may constitute from about 2 wt. % to about 40 wt. %, in some embodiments from about 5 wt. % to about 35 wt. %, and in some embodiments, from about 6 wt. % to about 30 wt. % of the filled polymer composition. Although the fibers may be employed within the ranges noted above, small fiber contents may be employed while still achieving the desired mechanical properties. For example, the fibers can be employed in small amounts such as from about 2 wt. % to about 20 wt. %, in some embodiments, from about 5 wt. % to about 16 wt. %, and in some embodiments, from about 6 wt. % to about 12 wt %.

Still other additives that can be included in the composition may include, for instance, antimicrobials, pigments (e.g., carbon black), antioxidants, stabilizers, surfactants, waxes, solid solvents, and other materials added to enhance properties and processability. Lubricants, for instance, may be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth;

hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

The solid-state polymerized polymer composition of the present invention may be employed in a wide variety of applications as is known in the art, such as blow molding, injection molding, rotational molding, sheet extrusion, thermoforming, etc. Due to its relatively high "low shear" viscosity and associated high degree of melt strength, the composition is particularly well suited for applications that involve the formation of a thin, sheet-like material or film. In certain embodiments, for example, the composition may be formed into a film and then "thermoformed" into the desired shape and/or size of the final product. The film may be prepared using any known technique, such as with a tubular trapped bubble film process, flat or tube cast film process, slit die flat cast film process, etc. Regardless of the manner in which it is formed, the film may be "thermoformed" by heating the film to a certain temperature so that it becomes flowable, shaping the film within a mold, and then trimming the shaped film to create the desired product. The product may, for example, be a package, container, tray (e.g., for a food product), electrical connector, circuit, bottle, pouch, cup, tub, pail, jar, box, etc.

According to one embodiment, a this, sheet-like material of the composition may be thermoformed by heating it to a certain temperature so that it becomes flowable, shaping the substrate within a mold, and then optionally trimming the shaped article to create the desired article. For example, a polymeric sheet can be first fed to a heating device that heats it to a temperature sufficient to cause the polymer to deform or stretch. In general, any suitable heating device may be used, such as a convection oven, electrical resistance heater, infrared heater, etc. Once heated, the polymeric sheet is fed to a molding device where it is molded into an article. Any of a variety of molding devices may be employed in the thermoforming process, such as a vacuum mold. Regardless, a force (e.g., suction force) is typically placed against the sheet to cause it to conform to the contours of the mold. At the contours, for instance, the draw ratio may be greater than 1:1 to about 5:1, Molding of the polymeric sheet typically occurs before the sheet substantially solidifies and/or crystallizes. Thus, the properties of the polymer are not only important during production of the polymeric sheets, but are also important during the subsequent molding process. If the polymeric sheet were to solidify and/or crystallize too quickly, the polymer may tear, rupture, blister or otherwise form defects in the final article during molding.

Although any suitable three-dimensional article can be formed, a melt-extruded substrate of composition is particularly well suited to producing cooking articles, such as cookware and bakeware. For example, when formed in accordance with the present invention, such articles can be capable of withstanding very high temperatures, including any oven environment for food processing. The articles are also chemical resistant and exceptionally inert. The articles, for instance, may be being exposed to any one of numerous chemicals used to prepare foods and for cleaning without degrading while remaining resistant to stress cracking. In addition, the articles may also possess excellent anti-stick or release properties. Thus, when molded into a cooking article, no separate coatings may be needed to prevent the article from sticking to food items. In this manner, many bakery goods can be prepared in cookware or bakeware without having to grease the pans before baking, thus affording a more sanitary working environment. The substrate also greatly reduces or eliminates a common issue of trapped food or grease in corners of rolled metal pans as solid radius corners can be easily incorporated into cookware.

The present invention may be better understood with reference to the following examples.

Test Methods

Melt Viscosity: The melt viscosity (Pa-s) was determined in accordance with ISO Test No. 11443 at 375° C. and at a shear rate of 400 s$^{-1}$ and 1000 s$^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Complex viscosity: The complex viscosity is used herein as an estimate for the "low shear" viscosity of the polymer composition at low frequencies. Complex viscosity is a frequency-dependent viscosity, determined during forced harmonic oscillation of shear stress at angular frequencies of 0.15 and 500 radians per second. Measurements were determined at a constant temperature of 375° C. and at a constant strain amplitude of 1% using an ARES-G2 rheometer (TA Instruments) with a parallel plate configuration (25 mm plate diameter).

Intrinsic Viscosity: The intrinsic viscosity ("IV") may be measured in accordance with ISO-1628-5 using a 50/50 (v/v) mixture of pentafluorophenol and hexafluoroisopropanol. Each sample was prepared in duplicate by weighing about 0.02 grams into a 22 mL vial. 10 mL of pentafluorophenol ("PFP") was added to each vial and the solvent. The vials were placed in a heating block set to 80° C. overnight. The following day 10 mL of hexafluoroisopropanol ("HFIP") was added to each vial. The final polymer concentration of each sample was about 0.1%. The samples were allowed to cool to room temperature and analyzed using a PolyVisc automatic viscometer.

Melting and Crystallization Temperatures: The melting temperature ("Tm") and crystallization temperature ("Tc") were determined by differential scanning calorimetry ("DSC") as is known in the art. The melting temperature is the differential scanning calorimetry (DSC) peak melt temperature as determined by ISO Test No. 11357. The crystallization temperature is determined from the cooling exotherm in the cooling cycle. Under the DSC procedure, samples were heated and cooled at 20° C. per minute as stated in ISO Standard 10350 using DSC measurements conducted on a TA Q2000 Instrument.

Synthesis of N4-phenyl-N1-[4-[[4-(phenylcarbamoyl)benzoyl]amino]phenyl]terephthalamide Compound A The synthesis of Compound A from 4-amino benzanilide and terephthaloyl chloride, can be performed according to the following scheme:

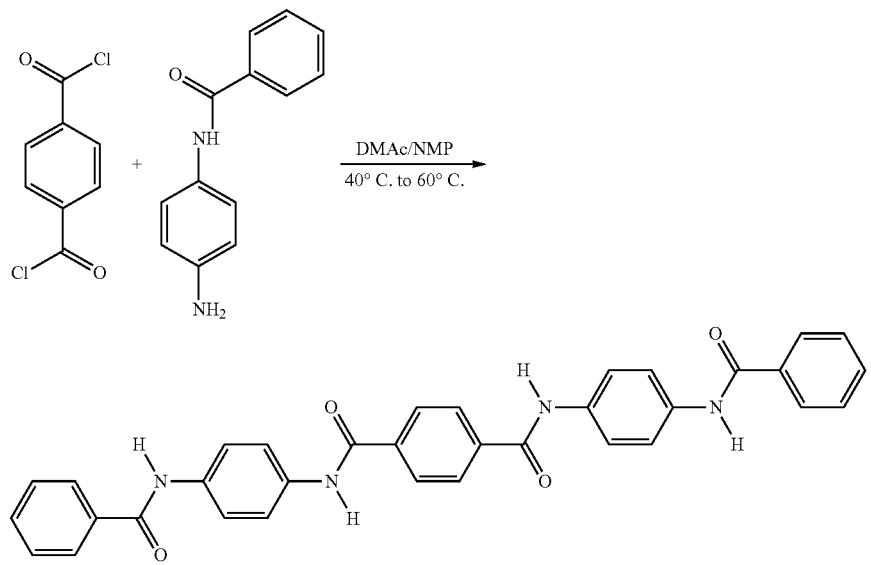

The experimental setup consisted of a 1 L glass beaker equipped with a glass rod stirrer coupled with an overhead mechanical stirrer. 4-aminobenzanilide (20.9 g) was dissolved in warm DMAc (250 mL) (alternatively N-methylpyrrolidone can also be used). Terephthaloyl chloride (10 g) was added to the stirred solution of the diamine maintained at 40-50° C., upon the addition of the acid chloride the reaction temperature increased from 50° C. to 80° C. After the addition of the acid chloride was completed, the reaction mixture was warmed to 70-80° C. and maintained at that temperature for about three hours and allowed to rest overnight at room temperature. The product was then isolated by the addition of water (500 mL) followed by vacuum filtration followed by washing with hot water (1 L). The product was then dried in a vacuum oven at 150° C. for about 6-8 hours, to give a pale yellow colored solid (yield ca. 90%). The melting point by DSC was 462° C.

Synthesis of N1,N3-bis(4-benzamidophenyl)benzene-1,3-dicarboxamide

Compound C2

The synthesis of Compound C2 from 1,4-phenylene diamine, terephthaloyl chloride, and benzoyl chloride may be performed according to the following scheme:

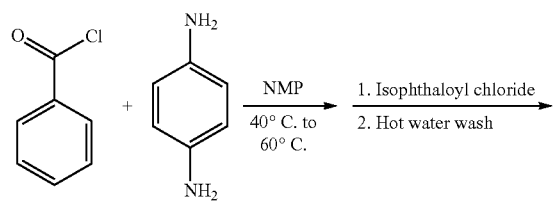

-continued

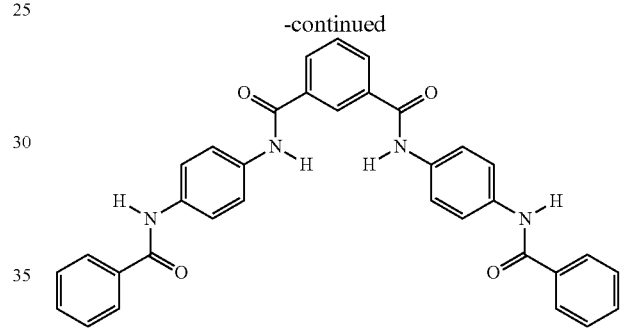

The experimental setup consisted of a 500 mL glass beaker equipped with a magnetic stirrer. 1,4 phenylene diamine (20 g) was dissolved in warm NMP (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and then allowed to cool to 50° C. After cooling to the desired temperature, isophthaloyl chloride (18.39 g) was added in small portions such that the temperature of the reaction mixture did not increase above 70° C. The mixture was then stirred for additional one (1) hour at 70° C., and was allowed to rest overnight at room temperature. The product was recovered by addition of water (200 mL) to the reaction mixture, followed by filtration and washing with hot water (500 mL). The product was then dried in a vacuum oven at 150° C. for about 6-8 hours to give a pale yellow colored solid (yield ca. 90%). The melting point by DSC was 329° C. The Proton NMR characterization for the compound is also shown in FIG. 1.

Synthesis of N1,N3-bis(3-benzamidophenyl)benzene-1,3-dicarboxamide

Compound D2

The synthesis of Compound D2 from 1,3-phenylene diamine, isophthaloyl chloride, and benzoyl chloride may be performed according to the following scheme:

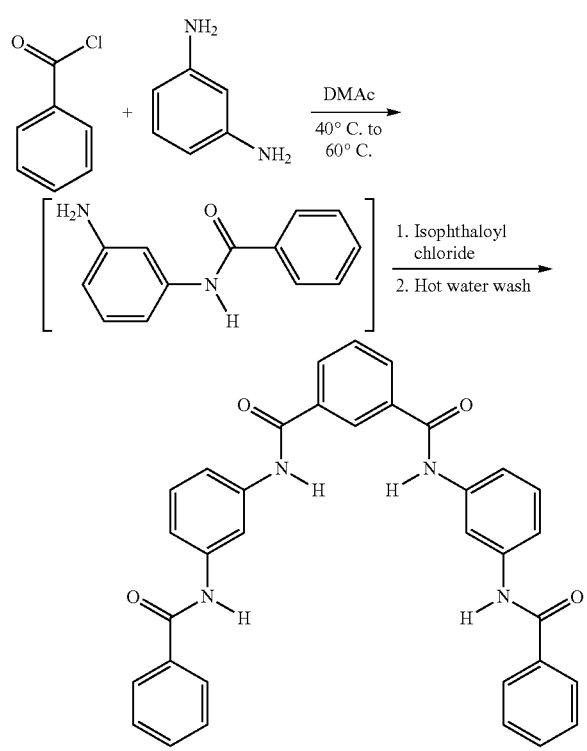

Figure 2:
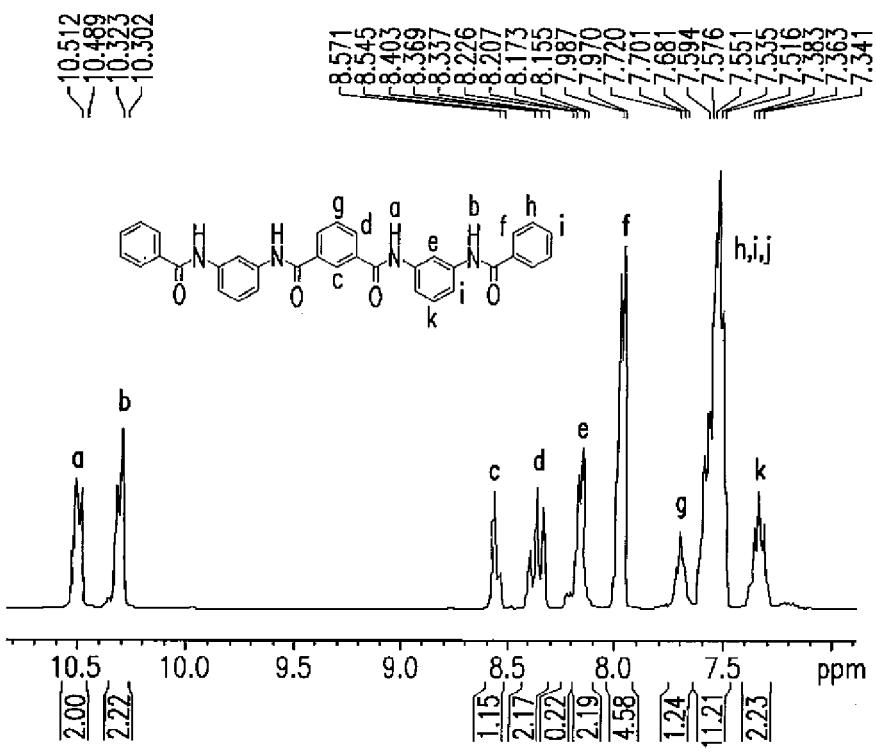
FIG. 2 is the Proton NMR characterization for N1,N3-bis(3-benzamidophenyl)benzene-1,3-dicarboxamide (Compound D2)

The experimental setup consisted of a 500 mL glass beaker equipped with a magnetic stirrer. 1,3 phenylene diamine (20 g) was dissolved in warm DMAc (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and allowed to cool to 50° C. After cooling to the desired temperature, isophthaloyl chloride (18.39 g) was added in small portions such that the temperature of the reaction mixture did not increase above 70° C. The mixture was then stirred for additional one hour at 70° C., and was allowed to rest overnight at room temperature. The product was recovered by addition of water (200 mL) to the reaction mixture, followed by filtration and washing with hot water (500 mL). The product was then dried in a vacuum oven at 150° C. for about 6-8 hours to give a pale yellow colored solid (yield ca. 90%). The Proton NMR characterization for the compound is also shown in FIG. 2.

Synthesis of
N1,N3,N5-triphenylbenzene-1,3,5-tricarboxamide

Compound F

Compound F was synthesized from trimesoyl chloride and aniline according to the following scheme:

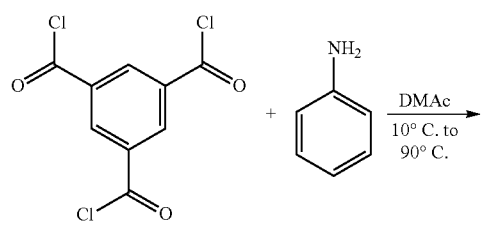

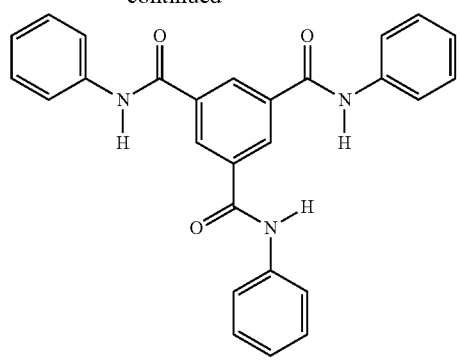

Figure 3:
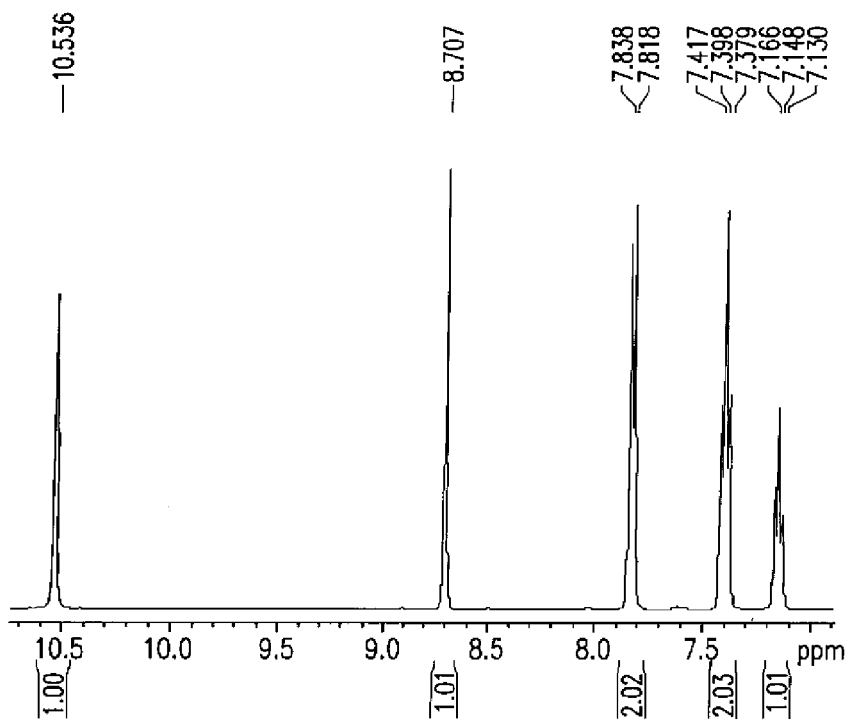
FIG. 3 is the Proton NMR characterization for N1,N3,N5-triphenylbenzene-1,3,5-tricarboxamide (Compound F)

The experimental set up consisted of a 2 L glass beaker equipped with a glass rod stirrer coupled with an overhead mechanical stirrer. Trimesoyl chloride (200 g) was dissolved in dimethyl acetamide ("DMAc") (1 L) and cooled by an ice bath to 10-20° C. Aniline (421 g) was added drop wise to a stirred solution of the acid chloride over a period of 1.5 to 2 hours. After the addition of the amine was completed, the reaction mixture was stirred additionally for 45 minutes, after which the temperature was increased to 90° C. for about 1 hour. The mixture was allowed to rest overnight at room temperature. The product was recovered by precipitation through the addition of 1.5 L of distilled water, which was followed by was vacuum filtration using a filter paper and a Buchner funnel. The crude product was washed with acetone (2 L) and then washed again with hot water (2 L). The product was then air dried over night at room temperature and then was dried in a vacuum oven 150° C. for 4 to 6 hours. The product (250 g) was a white solid, and had a melting point of 319.6° C., as determined by differential scanning calorimetry ("DSC"). The Proton NMR characterization for the compound is shown in FIG. 3.

Synthesis of N1,N3,N5-tris(4-benzamidophenyl)
benzene-1,3,5-tricarboxamide

Compound H

The synthesis of Compound H from trimesoyl chloride and 4-benzoanilide may be performed according to the following scheme:

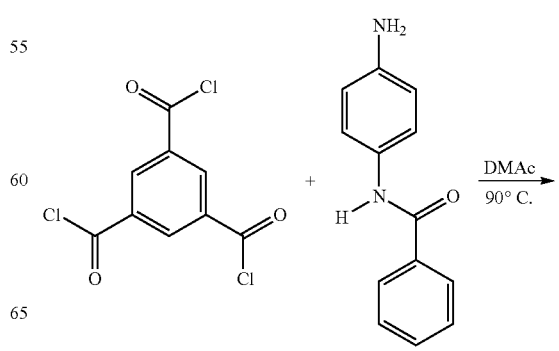

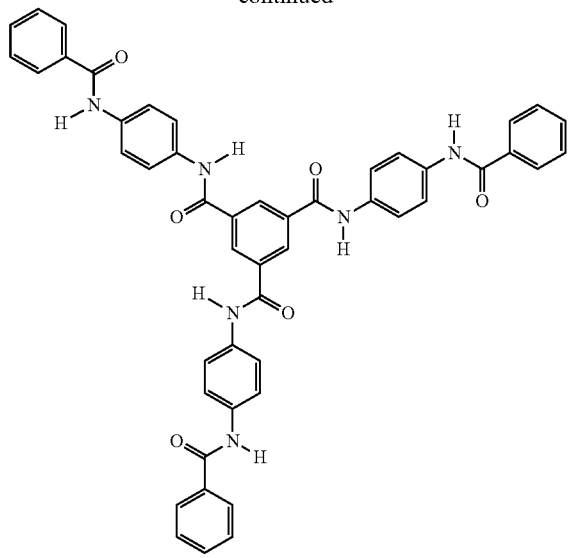

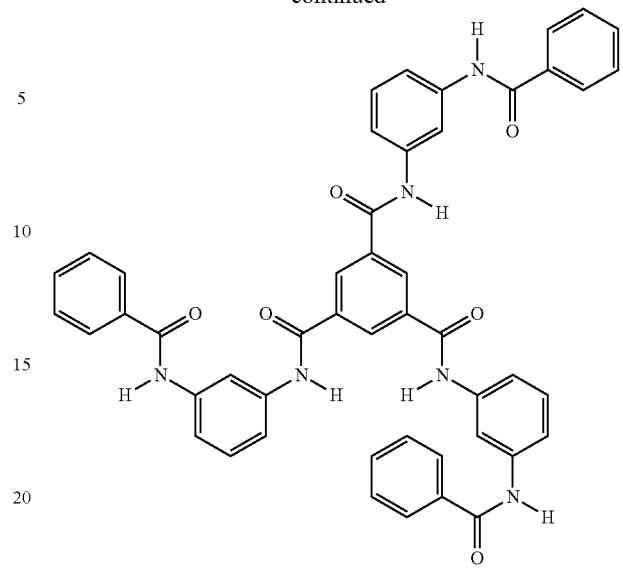

Figure 4:
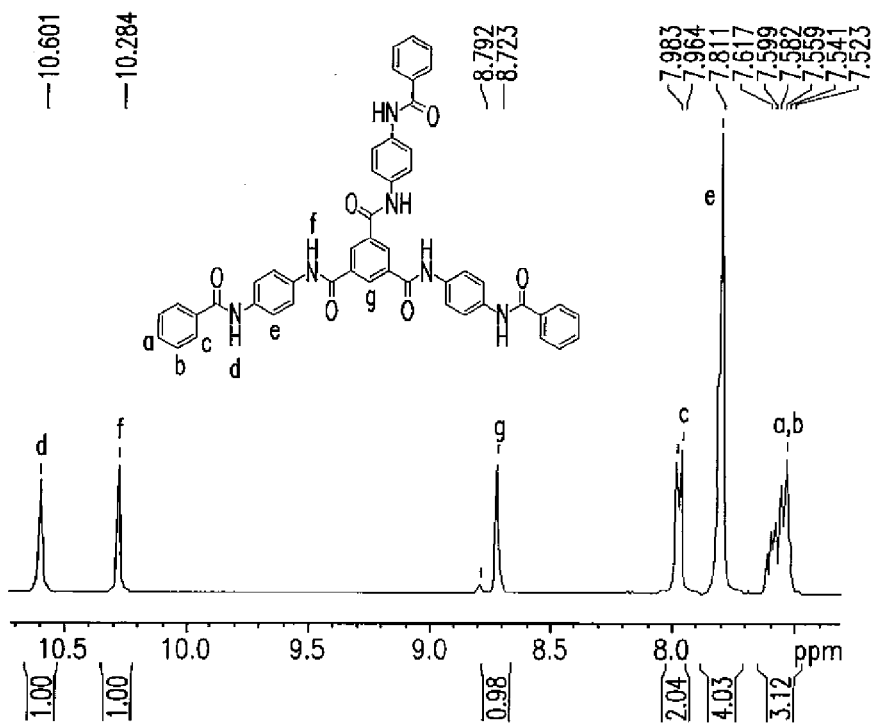
FIG. 4 is the Proton NMR characterization for N1,N3,N5-tris(4-benzamidophenyl)benzene-1,3,5-tricarboxamide (Compound H)

The experimental setup consisted of a 2 L glass beaker equipped with a glass rod stirrer coupled with an overhead mechanical stirrer. Trimesoyl chloride (27.8 g) was dissolved in DMAc (100 mL) at room temperature. 4-aminobenzanilide (69.3 g) was dissolved in DMAc (250 mL). The amine solution was gradually added to the acid chloride solution over a period of fifteen minutes, the reaction mixture was then stirred and the temperature was increased to 90° C. for about three hours. The mixture was allowed to rest overnight at room temperature. The product was recovered by precipitation by addition of 1.5 L of distilled water and followed by was vacuum filtration using a filter paper and a Buchner funnel. The crude product was then washed with acetone (500 mL) and then washed again with hot water (1 L). The product was then air dried over night at room temperature and then was dried in a vacuum oven 150° C. for 4-6 hours. The product (yield-80-85%) was a bright yellow solid. The Proton NMR characterization for the compound is shown in FIG. 4.

Synthesis of N1,N3,N5-tris(3-benzamidophenyl) benzene-1,3,5-tricarboxamide

Compound I

The synthesis of Compound I from trimesoyl chloride, benzoyl chloride and 1,3-phenylene diamine can be performed according to the following scheme:

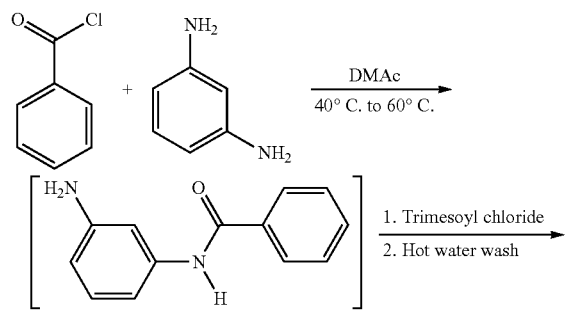

The experimental set up consisted of a 1 L glass beaker equipped with a glass rod stirrer coupled with an overhead mechanical stirrer. 1,3 phenylene diamine (20 g) was dissolved in warm dimethyl acetamide (200 mL) (alternatively N-methylpyrrolidone can also be used) and maintained at 45° C. Next benzoyl chloride (26.51 g) was slowly added drop wise over a period of 1.5 to 2 hours, to the amine solution with constant stirring. The rate of addition of the benzoyl chloride was maintained such that the reaction temperature was maintained less than 60° C. After complete addition of the benzoyl chloride, the reaction mixture was gradually warmed to 85-90° C. and then allowed to cool to around 45-50° C. At this point, trimesoyl chloride (16.03 g) was gradually added to the reaction mixture such that the exotherm did not increase the reaction temperature above 60° C. After complete addition of the trimesoyl chloride, the reaction mixture was allowed to stir for additional 45 minutes, after which the reaction temperature was increased to 90° C. for about 30 minutes and then was cooled to room temperature. The mixture was allowed to rest overnight at room temperature. The product was recovered by precipitation through the addition of 1.5 L of distilled water, which was followed by was vacuum filtration using a filter paper and a Buchner funnel. The crude product was then washed with acetone (250 mL) and washed again with hot water (500 mL). The product (yield: ca. 90%) was then air dried over night at room temperature and then was dried in a vacuum oven 150° C. for 4 to 6 hours. The product was a pale tan solid. The Proton NMR characterization was as follows: $^1$H NMR (400 MHz $d_6$-DMSO): 10.68 (s, 3H, CONH), 10.3 (s, 3H, CONH), 8.74 (s, 3H, central Ar), 8.1 (d, 3H, m-phenylene Ar), 7.9 (d, 6H, ortho-ArH), 7.51 (m, 15H, meta-para-ArH and 6H, m-phenylene Ar) and 7.36 (m, 3H, m-phenylene Ar).

Example 1

A 2 L flask was charged with 4-hydroxybenzoic acid (415.7 g), 2,6-hydroxynaphthoic acid (32 g), terephthalic acid (151.2 g), 4,4'-biphenol (122.9 g), acetaminophen (37.8 g), and 50 mg of potassium acetate. The flask was equipped with C-shaped stirrer, a thermal couple, a gas inlet, and distillation head. The flask was placed under a low nitrogen purge and acetic anhydride (99.7% assay, 497.6 g) was added.

The milky-white slurry was agitated at 75 rpm and heated to 140° C. over the course of 95 minutes using a fluidized sand bath. After this time, the mixture was then gradually heated to 360° C. steadily over 300 minutes. Reflux was seen once the reaction exceeded 140° C. and the overhead temperature increased to approximately 115° C. as acetic acid byproduct was removed from the system. During the heating, the mixture grew yellow and slightly more viscous and the vapor temperature gradually dropped to 90° C. Once the mixture had reached 360° C., the nitrogen flow was stopped. The flask was evacuated below 20 psi and the agitation slowed to 30 rpm over the course of 45 minutes. As the time under vacuum progressed, the mixture grew viscous. After 72 minutes, the final viscosity target was reached as gauged by the strain on the agitator motor (torque value of 30 units). The reaction was then stopped by releasing the vacuum and stopping the heat flow to the reactor. The flask was cooled and then polymer was recovered as a solid, dense yellow-brown plug. Sample for analytical testing was obtained by mechanical size reduction.

Example 2

A melt polymerized prepolymer was formed as described in Example 1, except that 19.65 grams of Compound A was also introduced into the reactor. It was observed that there were fewer residues in the distillate as compared to Example 1. The reaction was stopped after 72 minutes—no torque was observed on the agitator motor.

Example 3

A melt polymerized prepolymer was formed as described in Example 1, except that 19.76 grams of Compound F was also introduced into the reactor. It was observed that there were fewer residues in the distillate as compared to Example 1. The reaction was stopped after 72 minutes—no torque was observed on the agitator motor.

Example 4

A melt polymerized prepolymer was formed as described in Example 1, except that 18.7 grams of Compound H was also introduced into the reactor. It was observed that there were fewer residues in the distillate as compared to Example 1. The reaction was stopped after 72 minutes—a torque value of 50 units was observed on the agitator motor.

The thermal properties of the melt polymerized prepolymers of Examples 1-4 were tested as described above. The results are set forth below in Table 1.

TABLE 1

Properties of Melt Polymerized Prepolymers

| Example | Additive | Tm (° C.) | Tc (° C.) | IV (dL/g) | MV at 1000 s$^{-1}$ (Pa * s) | MV at 400 s$^{-1}$ (Pa * s) |
|---|---|---|---|---|---|---|
| 1 | — | 361.6 | 301.8 | 8.4 | 75.7 | 118.2 |
| 2 | A | 350.6 | 299.3 | 5.3 | 46.8 | 70.7 |
| 3 | F | 322.4 | 275.1 | 3.8 | 27.7 | 43.6 |
| 4 | H | 343.0 | 284.7 | 5.0 | 137.8 | 230.1 |

Example 5

The melt polymerized prepolymers of Examples 1-4 were solid-state polymerized by heating the prepolymers in an air circulated oven for eight (8) hours. The oven was maintained at 280° C. The polymer flakes (80 g) were placed uniformly in a thin layer within a glass tray. The thermal and rheological properties of the "solid-state polymerized" polymers were then tested as described above. The results are set forth below in Table 2.

TABLE 2

Properties of Solid-State Polymerized Compositions

| Example | Additive | Tm (° C.) | Tc (° C.) | Intrinsic Viscosity (dL/g) | MV at 1000 s$^{-1}$ (Pa * s) | Ratio of Solid State MV to Prepolymer MV (at 1000 s$^{-1}$) | MV at 400 s$^{-1}$ (Pa * s) | Ratio of Solid State MV to Prepolymer MV (at 400 s$^{-1}$) | Complex Viscosity (Pa * s), 0.15 rad/s |
|---|---|---|---|---|---|---|---|---|---|
| 1 | — | 359.8 | 299.6 | 12.6 | 263.2 | 3.48 | 561.2 | 4.75 | 51,520 |
| 2 | A | 350.6 | 299.1 | 8.3 | 139.6 | 2.98 | 259.9 | 3.67 | 145,842 |
| 3 | F | 323.1 | 275.8 | 6.8 | 225.0 | 8.12 | 455.9 | 10.46 | 116,438 |
| 4 | H | 355.5 | 298.7 | 8.6 | 860.0 | 6.24 | 3163.8 | 13.75 | 801,447 |

Figure 5:
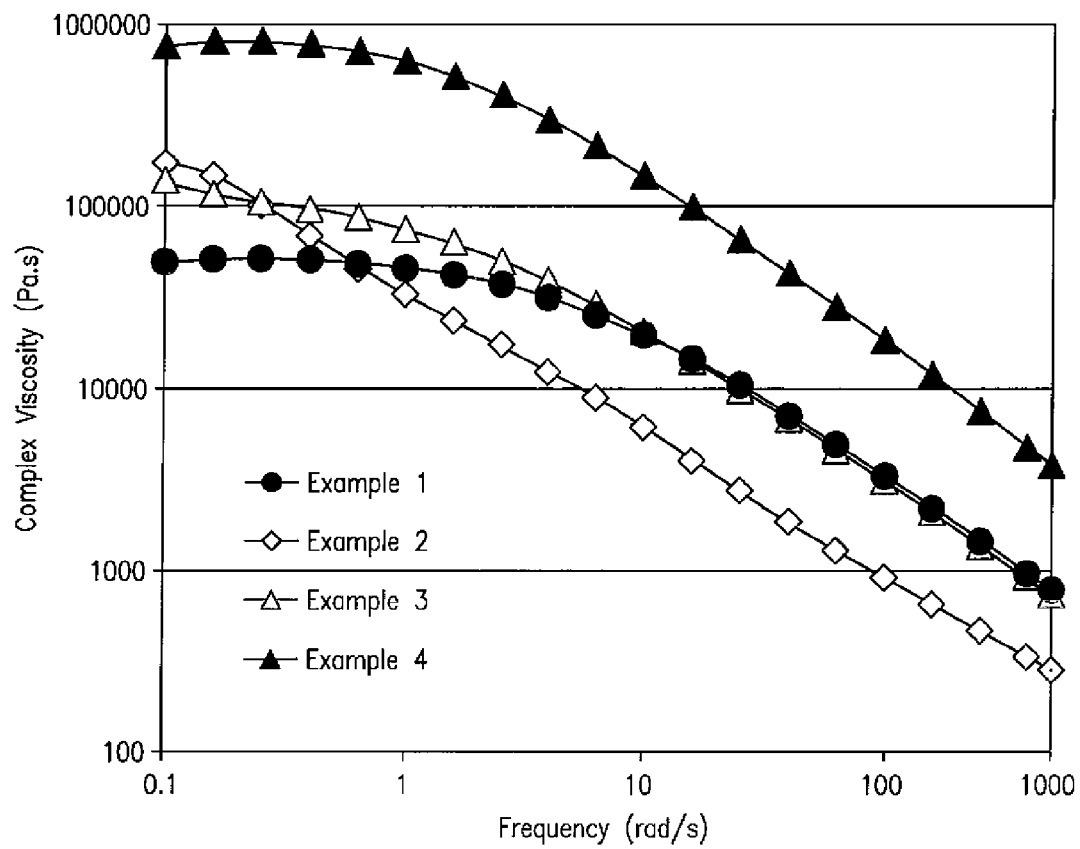
FIG. 5 is a graph showing complex viscosity (Pa*s) versus frequency (rad/s) for the solid-state polymerized samples of Examples 1-4.

As indicated, the use of Compounds A, F, and H in Examples 2-4 resulted in a significant increase in the complex viscosity at a frequency of 0.15 rad/s. Other frequencies were also tested, the results of which are shown in FIG. 5. Furthermore, as evidenced by the ratio of the solid state MV to the prepolymer MV, Compounds F and H significantly accelerated the extent to which melt viscosity was increased during solid-state polymerization. Although the polymerization time was held constant in these experiments, the increased rate at which MV was increased (indicative of an increased rate of prepolymer chain extension) can substantially reduce the solid-state polymerization time needed to achieve a certain molecular weight.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming liquid crystalline polymer, the method comprising:

melt polymerizing two or more monomers in the presence of an aromatic amide oligomer to form a prepolymer, wherein the oligomer has a molecular weight of from about 325 to about 5,000 grams per mole and has the following general formula (I):

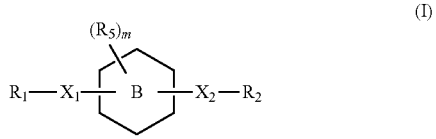

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O);

$R_1$ and $R_2$ are independently selected from aryl, heteroaryl, cycloalkyl, and heterocyclyl; and thereafter, solid-state polymerizing the prepolymer to form the liquid crystalline polymer.

2. The method of claim 1, wherein the liquid crystal polymer is wholly aromatic.

3. The method of claim 1, wherein the ratio of the melt viscosity of the liquid crystalline polymer to the melt viscosity of the prepolymer is from about 3 to about 20, as determined by a capillary rheometer at a shear rate of 1000 seconds$^{-1}$ and temperature of 375° C.

4. The method of claim 3, wherein the liquid crystalline polymer has a melt viscosity of from about 100 to about 2,000 Pa-s and the prepolymer has a melt viscosity of from about 10 to about 250 Pa-s, as determined by a capillary rheometer at a shear rate of 1000 seconds$^{-1}$ and temperature of 375° C.

5. The method of claim 1, wherein the polymer has a complex viscosity of about 100 kPa-s or more, determined by a parallel plate rheometer at an angular frequency of 0.15 radians per second, temperature of 375° C., and constant strain amplitude of 1%.

6. The method of claim 1, wherein ring B is phenyl.

7. The method of claim 1, wherein ring B is naphthyl.

8. The method of claim 1, wherein the aromatic amide oligomer has the following general formula (III):

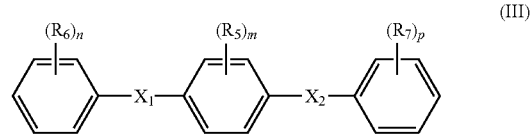

wherein, $X_1$ and $X_2$ are independently C(O)HN or NHC(O);

$R_5$, $R_6$, and $R_7$ are independently selected from halo, haloalkyl, alkyl, alkenyl, alkynyl, aryl, heteroaryl, cycloalkyl, and heterocyclyl;

m is from 0 to 4; and n and p are independently from 0 to 5.

9. The method of claim 8, wherein m is 0, n is from 1 to 5, and p is from 1 to 5.

10. The method of claim 9, wherein $R_6$, $R_7$, or both are unsubstituted aryl or aryl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl.

11. The method of claim 9, wherein $R_6$ and $R_7$ are phenyl substituted with —C(O)HN— or —NHC(O)—.

12. The method of claim 1, wherein the aromatic amide oligomer has the following general formula (IV):

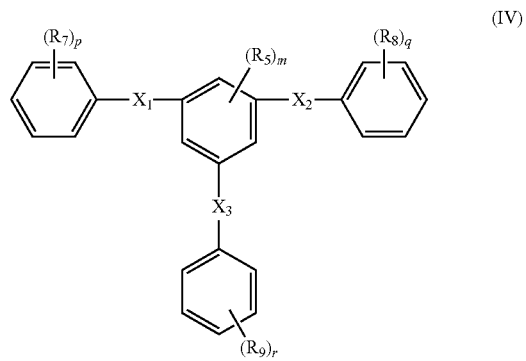

wherein, $X_1$, $X_2$, and $X_3$ are independently C(O)HN or NHC(O);

$R_5$, $R_7$, $R_8$, and $R_9$ are independently selected from halo, haloalkyl, alkyl, alkenyl, alkynyl, aryl, heteroaryl, cycloalkyl, and heterocyclyl;

m is from 0 to 3; and p, q, and r are independently from 0 to 5.

13. The method of claim 12, wherein $R_7$, $R_8$, and/or $R_9$ are unsubstituted aryl or aryl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl.

14. The method of claim 13, wherein $R_7$, $R_8$, and/or $R_9$ are phenyl substituted with —C(O)HN— or —NHC(O)—.

15. The method of claim 1, wherein the oligomer is selected from the group consisting of the following compounds and combinations thereof:

| Structure | Name |
|---|---|
| | N1,N4-bis(4-benzamidophenyl)terephthalamide |
| | N4-phenyl-N1-[4-[[4-(phenylcarbamoyl)benzoyl]amino]phenyl]terephthalamide |
| | N4-phenyl-N1-[3-[[4-(phenylcarbamoyl)benzoyl]amino]phenyl]terephthalamide |
| | N1,N3-bis(4-benzamidophenyl)benzene-1,3-dicarboxamide |

| Structure | Name |
|---|---|
|  | N3-phenyl-N1-[3-[[3-(phenylcarbamoyl)benzoyl]amino]phenyl]benzene-1,3-dicarboxamide |
|  | N1,N3-bis(3-benzamidophenyl)benzene-1,3-dicarboxamide |
|  | N1,N3-bis(4-phenylphenyl)benzene-1,3-dicarboxamide |
|  | N1,N3,N5-triphenylbenzene-1,3,5-tricarboxamide |

| Structure | Name |
|---|---|
| | N-(4,6-dibenzamido-1,3,5-triazin-2-yl)benzamide |
| | N1,N3,N5-tris(4-benzamidophenyl)benzene-1,3,5-tricarboxamide |
| | N1,N3,N5-tris(3-benzamidophenyl)benzene-1,3,5-tricarboxamide |

16. The method of claim 1, wherein the oligomer contains from 3 to 8 amide functional groups per molecule.

17. The method of claim 1, wherein the oligomer has a molecular weight of from about 400 to about 1,500 grams per mole.

18. The method of claim 1, wherein the monomers are selected from the group consisting of aromatic hydroxycarboxylic acids, aromatic dicarboxylic acids, aromatic diols, aromatic amines, aromatic diamines, and combinations thereof.

19. The method of claim 1, wherein the melt polymerizing of the monomers comprises heating a reaction mixture comprising the monomers and the oligomer within a reactor vessel to initiate a melt polycondensation reaction.

20. The method of claim 19, wherein aromatic amide oligomers are employed in an amount of from about 0.1 to about 5 parts by weight relative to 100 parts by weight of the reaction mixture.

21. The method of claim 1, wherein the solid-state polymerizing of the prepolymer comprises heating the prepolymer in the presence of a gas to initiate chain extension of the prepolymer.

22. A thermoformed article that comprises a liquid crystalline polymer formed according to the method of claim 1.

23. A sheet for use in thermoforming an article, the sheet comprising a thermotropic liquid crystalline polymer composition that includes a liquid crystalline polymer melt polymerized in the presence of an aromatic amide oligomer, wherein the composition has a melt viscosity of from about 150 to about 1,600 Pa-s as determined by a capillary rheometer at a shear rate of 1000 seconds$^{-1}$ and a temperature of 375° C. and a complex viscosity of about 200 kPa-s or more as determined by a parallel plate rheometer at an angular frequency of 0.15 radians per second, temperature of 375° C., and constant strain amplitude of 1%.

24. The sheet of claim 23, wherein the polymer has a melt viscosity of from about 200 to about 900 Pa-s as determined at a shear rate of 1000 seconds-1 and a temperature of 375° C. and a complex viscosity of from about 300 to about 2,000 kPa-s as determined at an angular frequency of 0.15 radians per second, temperature of 375° C., and constant strain amplitude of 1%.

25. The sheet of claim 23, wherein the polymer has a number average molecular weight of about 2,000 grams per mole or more.

26. The sheet of claim 23, wherein the polymer has a melting temperature of from about 270° C. to about 380° C.

27. The sheet of claim 23, wherein the liquid crystalline polymer is wholly aromatic.

* * * * *